United States Patent [19]

Thomson

[11] Patent Number: 4,649,057

[45] Date of Patent: Mar. 10, 1987

[54] PRESERVATIVE COATING AND METHOD FOR PRESERVING FRESH FOODS

[76] Inventor: Tom R. Thomson, 65 Ramon, Sonoma, Calif. 95476

[21] Appl. No.: 814,762

[22] Filed: Dec. 30, 1985

[51] Int. Cl.$^4$ .......................... A23D 5/00; A23D 5/02; A23B 7/00

[52] U.S. Cl. .................................. 426/532; 426/602; 426/333; 426/335

[58] Field of Search ................. 426/99, 307, 310, 301, 426/333, 335, 532, 602

[56] References Cited

U.S. PATENT DOCUMENTS

| | | | |
|---|---|---|---|
| 1,553,294 | 8/1925 | Baker | 426/602 |
| 3,906,117 | 9/1975 | Gawrilow | 426/602 X |
| 3,996,386 | 12/1976 | Malkki et al. | 426/335 X |
| 3,997,674 | 12/1976 | Ukai et al. | 426/310 X |
| 4,207,347 | 6/1980 | D'Atri | 426/92 |
| 4,336,272 | 6/1982 | Verrips et al. | 426/602 X |
| 4,434,185 | 2/1984 | Nelson | 426/310 X |

FOREIGN PATENT DOCUMENTS 419668 11/1934 United Kingdom ................ 426/301

OTHER PUBLICATIONS

Furia, T. E., "Handbook of Food Additives" 2nd Ed., vol. 1, CRC Press, Cleveland, Ohio, 1968, pp. 126–128.
Grant, J., "Hackh's Chemical Dictionary", McGraw-Hill Book Co., N.Y., 1944, p. 205.
"How to Shine An Apple," Feb. 1982, FDA Consumer, pp. 8–10.

*Primary Examiner*—Robert Yoncoskie
*Attorney, Agent, or Firm*—Warren F. B. Lindsley

[57] ABSTRACT

There is disclosed a preservative coating for fresh fruits and vegetables. The coating comprises approximately a 3 percent oil-in-water emulsion for which the active elements include approximately two parts partially hydrogenated vegetable oil and one part stearic acid and an anionic emulsifier.

6 Claims, No Drawings

PRESERVATIVE COATING AND METHOD FOR PRESERVING FRESH FOODS

BACKGROUND OF THE INVENTION

The present invention relates to the preservation of fresh foods and more particularly, to the composition of a coating material and a method of application to food products as a means for extending shelf life.

DESCRIPTION OF THE PRIOR ART

There is a continuing demand for fresh fruits and vegetables in an increasingly urban society in which the consumer typically lives many miles from the agricultural centers at which the food is produced. The harvesting, sorting, packing and shipping of the fruits or vegetables are time consuming operations, so that by the time such fresh food products have reached the consumer by way of the regional distribution center and the local distributor, they are already several days and even weeks old.

Most fruits and vegetables begin to dehydrate and deteriorate and lose some of their nutritional value and physical characteristics of freshness as soon as they are harvested. If no special precautions are taken beyond refrigeration, the shelf life of such products ranges from three to twelve weeks. Beyond that time, deterioration occurs rapidly with the development of undesirable odor, color changes and tissue breakdown until the product is no longer edible.

The shelf lives of some fruits and vegetables have been extended by the application of certain resins, shellacs, vegetable wax or paraffin to their outer surfaces. The February 1982 FDA Consumer article entitled "How to Shine an Apple", pages 8–10, discloses the uses of waxes to coat various fruit and vegetable items. Such coatings are effective to a degree, but many consumers object to preservative coatings or sprays which are not easily removed and are consumed with the food product.

U.S. Pat. No. 4,207,347 proposes a preservative coating primarily intended for application to fresh meat that is to be kept under refrigeration for extended periods of time. The preservative coating contains lard, tallow and lecithin in specific ratios. The mixture is heated and applied in molten condition to the chilled food that is to be preserved.

The coating disclosed in U.S. Pat. No. 4,207,347 can also be applied to fruits or vegetables. In some cases, a positive effect is again realized. As a coating for foods other than meats, however, this formulation is found objectionable (because of its lard and tallow content) by vegetarians and various religious groups. It is also difficult to apply thin enough to avoid a greasy texture and appearance.

Thus, there is a need for a preservative coating which may be applied to fresh fruits and vegetables to extend their shelf life or acceptable storage time without substantially affecting their "Market Quality". For application to fresh fruits and vegetables, such a coating should not include as ingredients any resins, shellacs, waxes or paraffins which are difficult to remove. Nor should it include animal fats such as lard (pork) or tallow (beef) which are found unacceptable by some consumers for dietary or religious reasons.

SUMMARY OF THE INVENTION

In accordance with the invention claimed, an improved preservative coating is provided for application to fresh food products and, in particular, to fruits and vegetables. The coating, which comprises an oil-in-water emulsion of partially hydrogenated vegetable oils and other natural elements including stearic acid is intended for use with or without refrigeration and with other precautionary measures normally employed in the handling and storage of such fresh food products.

It is, therefore, an object of the present invention to provide an improved preservative coating for fresh food products.

Another object of the invention is to provide a preservative coating for fruits and vegetables which effectively and significantly extends the shelf life of such food products while maintaining their appearance, texture and flavor.

A further object of the invention is to provide such a coating in a formulation that does not include resins, shellacs, waxes or paraffins which are difficult to remove prior to consumption of the food product.

A further object of the invention is to provide such a coating in a formulation that does not contain elements such as animal fats which some consumers find objectionable for dietary or religious reasons.

A still further object of the invention is to provide such a coating in a formulation which exhibits for itself a reasonable shelf life so that the coating material will not deteriorate prior to its application to the intended food product.

A still further object of the invention is to provide such a coating material in a form that may be applied in a convenient manner as by spraying or dipping at room temperature.

A still further object of the invention is to provide such a material in a form that adheres well to the intended food products, including in particular, fresh fruits and vegetables, without requiring any difficult or inconvenient methods or conditions of application.

A still further object of the invention is to provide such a coating in a formulation that discourages the formation or growth of molds and bacteria.

A still further object of the invention is to provide such a coating in a form that does not adversely affect the appearance, texture or flavor of the food product to which it is applied.

Yet another object of the invention is to provide such a coating in a form that is inexpensive in terms of its contents, its preparation and its application.

Further objects and advantages of the invention will become apparent as the following description proceeds, and the features of novelty which characterize the invention will be pointed out with particularity in the claims annexed to and forming a part of this specification.

DESCRIPTION OF THE PREFERRED EMBODIMENT

The preservative coating of the present invention comprises an oil-in-water emulsion of a mixture of partially hydrogenated vegetable oils and stearic acid with the addition of certain emulsifying agents and preservatives. As set forth in the previously stated objects of the invention, it is intended primarily for application to fresh fruits and vegetables and its contents, and properties are, therefore, tailored to the specific requirements for such applications. This is in contrast to the requirements of the prior art coating referenced earlier (U.S. Pat. No. 4,207,347) which is intended primarily for application to fresh cut meats.

In its preferred embodiment, the protective coating of the present invention is an emulsion of a partially hydrogenated vegetable oil (hereafter referred to as shortening) and stearic acid mixture along with certain emulsifying agents and preservatives. Stearic acid comprises a white crystalline fatty acid, $CH_3(CH_2)_{16}CO_2H$ obtained by saponifying tallow or other hard fats containing stearin. Commercial stearic acid (stearine) is commonly a mixture of stearic and palmitic acids.

More specifically, a test sample of the coating material contained the following elements in the indicated quantities by weight:
150 grams of distilled water or equivalent milliliters
3 grams of shortening
1.5 grams of stearic acid
0.3 grams of an anionic emulsifier
0.15 grams of methylparaben It should be noted that the above 3 percent solution may be varied and still fall within the scope of this invention to comprise anywhere from a 1 to 5 percent of an oil-in-water emulsion. For example, a 2 to a 4 percent solution may be obtained by varying the distilled water from 100 to 200 grams. Thus, a 2 percent solution would contain 225 grams of water, all other ingredients remaining the same and a 4 percent solution would contain 112.5 grams of distilled water with all other ingredients remaining the same.

The shortening serves as the main protective element by virtue of its hydrophobic nature and its attendant capability for sealing a surface against the rapid penetration of air and moisture. The commercially distributed vegetable shortening employed in the test sample was "Crisco", a Procter & Gamble product. The lipid, as indicated by the label, consists of partially hydrogenated soybean, palm and sunflower oils, along with minor amounts of other ingredients, some of which are naturally present and others that are added. Other minor ingredients listed include vegetable mono and diglycerides. The use of hydrogenated vegetable oils as the sealing or protective element rather than lard or tallow avoids a first undesirable feature of prior art protective coating materials, namely that it is unacceptable for dietary or religious reasons.

The addition of the stearic acid, a product distributed by Norman Fox, a distributor of Vernon, Calif., to the shortening, discourages the growth of molds which have a tendency to form in oil and water mixtures. Other organic acids, such as benzoic acid or sorbic acid might have been employed for this purpose, but stearic acid was preferred because it also tends to "harden" the shortening, giving it a waxy, tallow-like consistency. Stearic acid is a completely saturated natural ingredient commonly derived from beef tallow, but also obtainable from vegetable oils, such as palm oil.

An even more important feature of the stearic acid is its ability to partially ionize, giving the microscopic oil droplets a negative charge that is essential to the stability of the colloidal emulsion that otherwise would tend to "cream out" as a separate oily layer. Properly prepared, the oil droplets are less than a micron in size, small enough to exhibit Brownian Movement and visible only under a high power microscope. The Brownian Movement or motion is the rapid vibratory movement exhibited by microscopic particles suspended in a fluid.

The detergents used may be anionic. In one example, an anionic detergent in water solution form was added as an emulsifying agent. The specific detergent employed was "high suds LOC" from Amway. In use, the anionic detergent employed must be compatible with the stearic acid and the negative charge on the oil droplets.

The methylparaben (parahydroxymethylbenzoate) was added as a preservative for the extension of the shelf life of the coating material. It is extensively used as a fungicide in food.

The application of the shortening-stearic acid mixture as an emulsion with water is employed as a means for obtaining a relatively thin coating in a convenient manner. As an emulsion, the coating may be readily applied by spraying or dipping. The undiluted mixture, by way of contrast, is too thick and heavy for spraying and is very difficult to apply in a thin enough layer to prevent an oily, greasy appearance and texture which reduces the appeal of the coated fruit or vegetable. The thin coating was found adequate to preserve the products.

There are two basic types of water and oil emulsions. Relatively low oil contents produce oil-in-water (O/W) emulsions while relatively low water contents produce water-in-oil (W/O) emulsions. In an oil-in-water emulsion, very fine droplets of oil are suspended in the water, while in a water-in-oil emulsion, water droplets are suspended in the oil. An emulsifying agent is a substance that is attracted to both the water and the oil. The emulsifying agent is thus attracted to the boundaries of the suspended droplets where it tends to sustain the emulsified state of the mixture.

The oil-in-water emulsion was preferred over a water-in-oil emulsion for two reasons: First, the oil-in-water emulsion yields a thinner and more easily applied coating material. Second, the oil-in-water emulsion is preferred in terms of its characteristics relative to preventing mold growth. Molds form and grow best in water that is deprived of air. In an oil-in-water emulsion, the water phase is exposed to air, while in a water-in-oil emulsion, which usually is a cream rather than a liquid, the suspended water droplets are sealed off by the surrounding oil body, thus providing an anaerobic environment for organisms that usually are found in the aqueous phase.

A 3 percent oil-to-water content was found superior to higher contents of active ingredients. Stronger solutions such as 5 percent or 6 percent were found to be too rich with a tendency for separation. The 3 percent solution produces a very good emulsion, with a particle size of less than one micron. The emulsion was also quite stable, separating only slightly after eleven days, and going quickly back into suspension with mild agitation.

The following procedure is followed for the preparation of the coating material:

1. Melt the shortening and the stearic acid together (a temperature above the melting point of stearic acid, 70° C., is required).
2. Add the methylparaben to the lipid-acid mixture and let it dissolve.
3. Add the anionic detergent to the above mixture.
4. Preheat the water to 80° C. and pour into a blender.
5. With the blender operating at high speed, pour the shortening-stearic acid mixture slowly into the water in the blender.
6. Continue blender operation for three to five minutes.

The above preparation yields a white milky emulsion that remains stable for more than a month at room temperature.

The emulsion is applied at room temperature to the surface of fruits or vegetables. It may be applied by dipping or by spraying, after which the surface is buffed with soft brushes to distribute the coating evenly over the surface. A thicker coating may be obtained by repeating the application and buffing procedures as many times as desired. The fruit or vegetables are then stored at approximately 50°-55° F.

The coating may be removed using a mild detergent and a soft brushing action followed by a rinse and a drying operation.

Tests conducted to date indicate that the preservative coating as just described is more effective for certain kinds of fruits or vegetables than for others. While the coating appeared not to extend the shelf life of pears or apples, it nearly doubled the life of nectarines (from nine days for an untreated sample, to seventeen days for a treated sample). The same coating apparently extended the life of tomatoes by a factor of three (from seven days for an untreated sample to twenty-four days for a treated sample), while mangos and papayas appeared to survive as long or longer without the coating.

The preservative coating of the invention is thus seen to provide effective protection for certain kinds of fresh fruits and vegetables. In addition, it meets the other criteria set forth in the stated objects of the invention. The coating contains no resins, shellacs or paraffins. Assuming the stearic acid is derived from a vegetable source, the coating is also free of animal products. It is inexpensive, it has a long shelf life, and may easily be applied at room temperature by spraying or dipping. The coating adheres well, and does not adversely affect the appearance, texture or flavors of the fruit.

It will be recognized that many types of partially hydrogenated vegetable oils may be used, and that other types of organic acids such as benzoic or sorbic acid may be substituted for the stearic acid. It is also possible that other types or forms of vegetable oils such as shortening mixtures may prove more broadly effective for all types of fruits and vegetables. The amount of emulsifying agent used will vary depending on the degree of hydrogenation of the lipid used. Generally, the more unsaturated the lipid, the more emulsifying agent necessary.

Thus, in accordance with the teachings of this invention, one pound of concentrate of the partially hydrogenated vegetable oil, stearic acid, an anionic detergent and methylparaben (less water) may cover approximately 6,000 pounds of fruit.

One pound of the 3 percent emulsion will cover approximately 180 pounds of fruit and one gallon of 3 percent emulsion will cover approximately 1,500 pounds of fruit.

Although distilled water is recommended for use, any form of relatively pure water can be used successfully.

Should excessive foaming result because of the detergent used, a small amount of a suitable anti-foaming agent might be required in the preparation of the emulsion disclosed.

An improved preservative coating is thus provided for application to fresh fruits and vegetables and although but a single embodiment of the invention has been illustrated and described, it will be apparent to those skilled in the art that various changes and modifications may be made therein without departing from the spirit of the invention or from the scope of the appended claims.

What is claimed is:

1. A composition of matter for coating and preserving food consisting essentially of an oil-in-water emulsion comprising by weight:
   approximately 100 to 200 grams of water,
   approximately 3 grams of a vegetable shortening,
   approximately 1.5 grams of stearic acid,
   approximately 0.3 grams of an anionic emulsifier, and
   approximately 0.15 grams of methylparaben.

2. The composition of matter set forth in claim 1 wherein:
   said water comprises approximately 150 grams.

3. A method of preparing a preservative coating for foods comprising the steps of:
   mixing a vegetable shortening, an anionic emulsifier and stearic acid to form a mixture, the ratio of said shortening and acid being substantially 2 to 1, respectively, said shortening and stearic acid is used in an amount sufficient to form an emulsion but no more than 5% of the emulsion,
   preheating approximately 100 to 200 grams of water to approximately 80° Centigrade, and
   adding and blending said mixture into said heated water to form an oil-in-water emulsion.

4. The method set forth in claim 3 in further combination with the step of:
   adding methylparaben as a fungicide prior to the blending action.

5. The method set forth in claim 4 wherein:
   said methylparaben comprises approximately 3 percent of said mixture by weight.

6. A method of preparing a preservative coating for food comprising the steps of:
   mixing and melting 3 grams of hydrogenated soybean oil with 1.5 grams of stearic acid to form a first mixture,
   adding approximately 0.15 grams of methylparaben to said first mixture to form a second mixture,
   adding and mixing 0.3 grams of an anionic emulsifier to said second mixture to form a third mixture,
   preheating approximately 150 grams of water to approximately 80° Centigrade, and
   blending said third mixture into said preheated water to form an oil-in-water emulsion.

* * * * *